United States Patent [19]

Buchner

[11] Patent Number: 5,395,136
[45] Date of Patent: Mar. 7, 1995

[54] SAFETY BELT FOR MOTOR VEHICLES

[76] Inventor: Fritz Buchner, Rastatter Strasse 83, D-68239 Mannheim, Germany

[21] Appl. No.: 187,700

[22] Filed: Jan. 27, 1994

[30] Foreign Application Priority Data

Jan. 28, 1993 [DE] Germany .................. 43 02 352.5

[51] Int. Cl.⁶ .................. B60R 7/04; B26B 27/00
[52] U.S. Cl. .................................. 280/801.1; 30/294
[58] Field of Search .................. 280/801.1, 808; 297/468, 483; 30/289, 294; 83/745

[56] References Cited

U.S. PATENT DOCUMENTS 5,085,449  2/1992  Hudson ..................... 280/801.1

FOREIGN PATENT DOCUMENTS 2581944  11/1986  France ..................... 280/801.1
2647069  11/1990  France ..................... 280/801.1
3443205   7/1986  Germany .................. 280/801.1
3619650  12/1987  Germany .................. 280/801.1

Primary Examiner—Margaret A. Focarino
Assistant Examiner—Paul N. Dickson
Attorney, Agent, or Firm—Max Fogiel

[57] ABSTRACT

A seat-belt system for motor vehicles, in which one end of the belt is secured to the vehicle or a belt tensioner. The belt can be severed by a mechanism that is clasped tightly against the belt. This mechanism includes a slot which clasps the belt as it extends therethrough. The mechanism has two blades positioned at separate points along the belt and acting in conjunction and across the belt. The clasping section of the mechanism is between the two blades.

13 Claims, 2 Drawing Sheets

SAFETY BELT FOR MOTOR VEHICLES

BACKGROUND OF THE INVENTION

The present invention concerns a seat-belt system, especially for use in motor vehicles although not limited to that field of application. One end of the belt is secured to the vehicle or in a belt tensioner. A buckle engages with a belt-locking mechanism that is fastened to the vehicle. A mechanism that can be employed when desired to sever the belt is clasped tight against one section of the belt. The belt-severing mechanism includes a slot that accommodates the belt. One section of the slot clasps at least one section of the belt as the belt extends through it.

Seat-belt systems of this type and for this purpose are generally known. Millions of what are called three-point belts have already been employed, especially in motor vehicles. One end of the belt is accommodated on a belt tensioner that locks the belt in place when the vehicle sudden decelerates. The other end of the belt can be secured for example to the bottom of a post between the vehicle's front and rear doors. A buckle travels back and forth along the belt and can engage a belt-locking mechanism.

Although seat-belt systems of this type have often been proven effective, they do have drawbacks. They can for example prevent passengers from getting out of a vehicle that has been badly damaged in an accident. Mechanisms clasped tight to sections of the belt and severing them in such emergencies have accordingly been suggested.

A seat-belt severing device for motor vehicles is known from German OS 2 841 404 for example. It comprises a belt-accommodating slot between a base and a top. A blade extends across a belt that extends through the slot. The belt-accommodating slot has a section on one side of the blade guide that clasp at least one section of the belt tight when the system is in use and prevents the device from undesirably sliding along the belt.

A device similar in structure and purpose and called a belt capper is known from German GM 8 223 436. The belt-accommodating slot also has a clasping section on one side of the blade guide, whereas the section of the belt-accommodating slot on the other side of the blade guide only loosely secures the section of belt that extends through it.

The severing-mechanism clasping sections of the belt-accommodating slots ensures that these known belt-severing mechanisms will not slide back and forth along the belt. The mechanisms can accordingly be simply mounted at preferably accessible points on the belts. It is recommended that the section of a buckled motor-vehicle seat belt between the end secured to the vehicle and the buckle be on approximately the same level as the thighs of the passenger that the belt is securing.

Since the belt-severing mechanism cannot slide back and forth along the belt because of being clasped tight within a section on one side of the blade guide, the mechanism must be mounted on the belt with the severing-mechanism clasping section facing the end of the belt secured to the vehicle so that, when the belt is severed, the section on the other side of the blade guide can slide unimpeded out of the belt-accommodating slot. If on the other hand the belt-severing mechanism is incorrectly secured to the belt with the severing-mechanism clasping section toward the buckle, only the section of the belt that is fastened to the vehicle will be able to slide out of the belt-accommodating slot, and the belt-severing mechanism, which is clasped tight in the clasping section, will remain fastened to the other section of the belt. The severed belt can accordingly slide through the buckle only until the belt-severing mechanism comes into contact with the buckle and will not release the passenger secured by the belt.

The known belt-severing mechanisms have also been proven difficult to handle in that the blades, which are accommodated in transverse guides, can only be actuated by removing means of security that act at an angle to, and interlock with, the blade guides and applying tension to eyes that project out next to the severing mechanism. It has been demonstrated that such means of security are difficult to disengage when a vehicle is severely damaged and that it is accordingly difficult to rescue accident victims. Since vehicular collisions always entail a risk of fire however, getting the passengers out on time is a matter of life or death.

SUMMARY OF THE INVENTION

The present invention is accordingly intended to improve the initially described safety-belt system with its belt-severing mechanism securely fastened to one section of the belt to the extent that the belt can be rapidly and reliably severed when necessary on the side of the belt-severing mechanism toward the buckle and that the severed belt can slide out of the buckle unimpeded.

This object is attained in accordance with the invention in a seat-belt system as recited in the preamble to claim 1 in that the belt-severing mechanism includes means of severing the belt in the form of two blades positioned at separate points along the belt and acting in conjunction and across the belt and in that the severing-mechanism clasping section is between the two blades.

The point of the present invention is accordingly that, when the belt-severing mechanism is actuated, the belt, which is secured by being clasped in the vicinity of the severing-mechanism clasping section, can be separated at each end from that section, with the consequence that the belt-severing mechanism, initially securely fastened to the belt, can be entirely cut out of the belt and that both separated ends of the belt can slide out of the belt-accommodating slot. Any passenger secured by the intact belt will accordingly be entirely free once the belt has been severed and can leave the vehicle or be removed to safety by emergency personnel.

The blades in the belt-severing mechanism in one sensible advanced version of the invention are associated with a slide that slides across the belt-accommodating slot. The slide is clasped in position at one side with the blades not engaging the belt and slides across the belt guide constituted by the belt-accommodating slot in order to sever the belt.

The ends of the blades remote from the slide in another advanced version of the invention engage blade-guiding grooves at the end of the belt-accommodating slot remote from, and extending at an angle to, the belt-accommodating slot. This version ensures particularly reliable and effective separation of the belt.

It will be of advantage for the belt-severing mechanism in the seat-belt system in accordance with the invention to comprise a top, accommodating the slide sliding along a track inside it, and a base fastened to the top, between which the belt-accommodating slot extends along with the section wherein the section of belt extending through the slot is clasped.

The base and top in this embodiment can be essentially congruent injection-molded plastic components secured with appropriate screws for example after being folded together with the belt-accommodating slot left between them. The top and base can be joined together by a spliced-on hinge. Bases and tops of this description have been demonstrated to be particularly practical and cost-effective as well as easy to assemble.

The belt-severing mechanism in the seat-belt system in accordance with the invention can also be prevented from severing the belt by a cover. The cover can extend over the slide in the vicinity of the track that extends across the belt-accommodating slot. The cover can be secured over the slide by a clip-like stop. The compression exerted by the stop can be overcome and the cover pivoted up to release the slide.

The severance-prevention cover preferably pivots on the belt-severing mechanism around an axis that parallels the belt-accommodating slot and extends along the belt. It prevents the slide from being actuated accidentally and undesirably and accordingly effectively prevents the blade from severing the belt. The severance-prevention cover will be particularly effective when it is provided with a barrier tab that, when the cover is down, mechanically prevents the slide from actuating the belt-severing mechanism while allowing it full liberty when the cover is up.

The clip-like stop on the severance-prevention cover can in this event be associated with the barrier tabs in the form of spring-loaded spherical snap-in knobs that project out at the side beyond the barrier tabs and, in the stopping position, engage notches in the vicinity of the slide track.

The severance-prevention cover in another embodiment of the invention, however, can pivot on the belt-severing mechanism around an axis perpendicular to the belt-accommodating slot and to the belt. A front edge that acts as an impact point for the slide can block the path of the slide and its blades while the cover is covering and protecting the slide track.

The severance-prevention cover in this embodiment of the belt-severing mechanism will accordingly pivot along the belt into a position in which it releases the slide. Such an embodiment is easier to handle.

BRIEF DESCRIPTION OF THE DRAWINGS

Two embodiments of the present invention will now be specified with reference to the accompanying schematic drawing, wherein.

DETAILED DESCRIPTION

The illustrated seat-belt system is a three-point system of the type generally known and used today in motor vehicles. One end of the belt is accommodated in a belt tensioner at an appropriate point in a vehicle. The other end is secured stationary inside the vehicle. A buckle slides back and forth along the belt between the belt tensioner and the stationary end and can be coupled as desired with a belt-locking mechanism fastened tight to the vehicle.

FIGS. 1 through 3 and 4 and 5 illustrate different versions of a single belt section, each with a mechanism of a type to be specified hereinafter that can be employed to sever the belt when the belt-locking mechanism is inaccessible or when the belt cannot be opened due to a damaged buckle.

Figure 1:
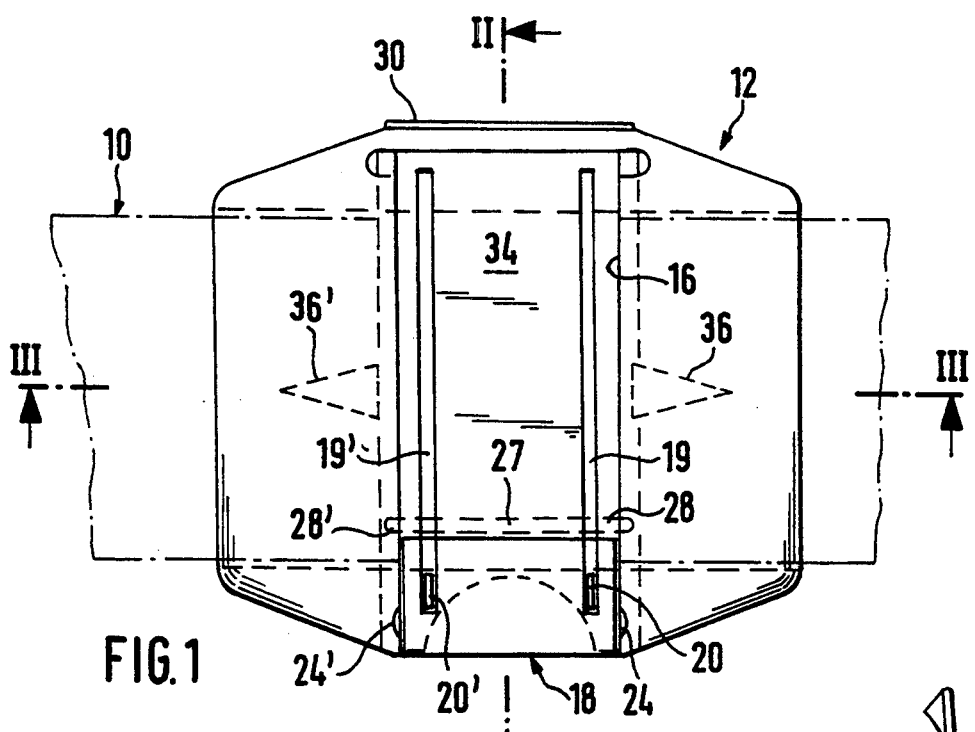
FIG. 1 is a front view of a section of belt with a belt-severing mechanism fastened to it tight, with two blades at separate points along the belt and associated with a slide that slides across the belt, and with a clasping section between the blades.
Figure 2:
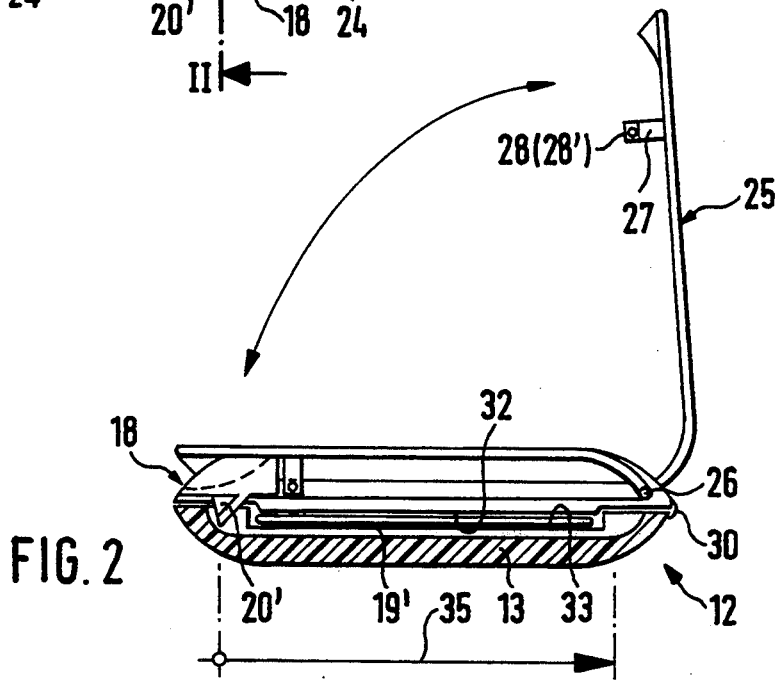
FIG. 2 is a section along the line II—II in FIG. 1 through a belt-severing mechanism accommodated on the belt section and with the severance-prevention cover folded up.
Figure 3:
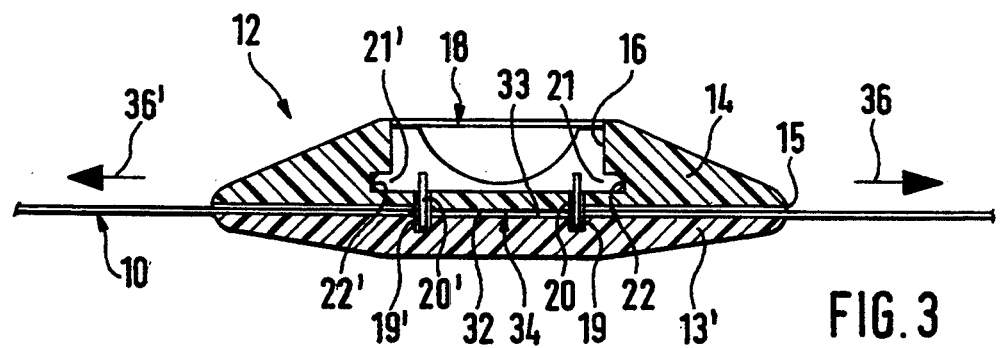
FIG. 3 is a longitudinal section along the line III—III in FIG. 1 through the belt-severing mechanism accommodated on the belt section with the severance-prevention cover left off and with the slide and blades slid beyond the incision.

The belt-severing mechanism 12 illustrated in FIGS. 1 through 3 rests against one section of a seat belt 10. Belt-severing mechanism 12 essentially comprises a base 13 and a top 14. Base 13 and top 14 match each other in size and shape. Belt 10 extends through a slot 15 left between the base and the top. A slide 18 slides back and forth in a transverse channel 16 in the top. The slide accommodates two blades 20 and 20'. Blades 20 and 20' are positioned at separate points along the channel and engage guiding grooves 19 and 19' in base 13. The slide is provided with laterally projecting flanges 21 and 21'. Flanges 21 and 21' engage grooves 22 and 22' extending along the channel 16 in top 14 that accommodates slide 18.

The slide 18 illustrated in FIGS. 1 and 2 is accommodated along with blades 20 and 20' in a position at one side of the section of belt in slot 15. Slide 18 is maintained in this disengaged position by stops 24 and 24' in the form of clips. The slide 18 is secured by a severance-prevention cover 25 that fits over it. Cover 25 swings up into the position illustrated in FIG. 2 around an axis 26 of articulation. Axis 26 is accommodated in top 14 across from the position of the slide in FIG. 1. The cover is provided with a tab 27. When tab 27 is in the securing position, it is in front of slide 18 and blades 20 and 20' on the side facing the axis and accordingly helps maintain them in the position they are already secured in by catches 24 and 24'. Cover 25 is maintained closed by catches 28 and 28'. Catches 28 and 28' project out at the side from the tab 27 that secures slide 18 and blades 20 and 20' in position. Catches 28 and 28' lock into matching holes in channel 16.

The base 13 and top 14 of belt-severing mechanism 12 are essentially injection-molded halves of the same size and shape fastened together by a hinge 30. The belt-severing mechanism is installed, once slide 18 and blades 20 and 20' have been assembled, by introducing the belt section into a positioning area extending along base 13 and by folding top 14 up around hinge 30 onto, and coincident with, the top. The base and top are then secured in a known way with unillustrated screws.

The lateral edges of the folded-together base and top are higher than the belt guide constituted by belt-accommodating slot 15. When base 13 and top 14 are secured together with the screws, the section of belt accommodated between them is clasped tight in a section 34 between blades 20 and 20' comprising a force-application plate 32 in top 14 and a counterpressure-application plate 33 in base 13. Belt-severing mechanism 12 is accordingly fastened to the belt. The sections of belt-accommodating slot 15 on the side of blades 20 and 20' facing away from the clasping section on the other hand only loosely accommodate the section of belt that extends through the belt-severing mechanism.

Figure 4:
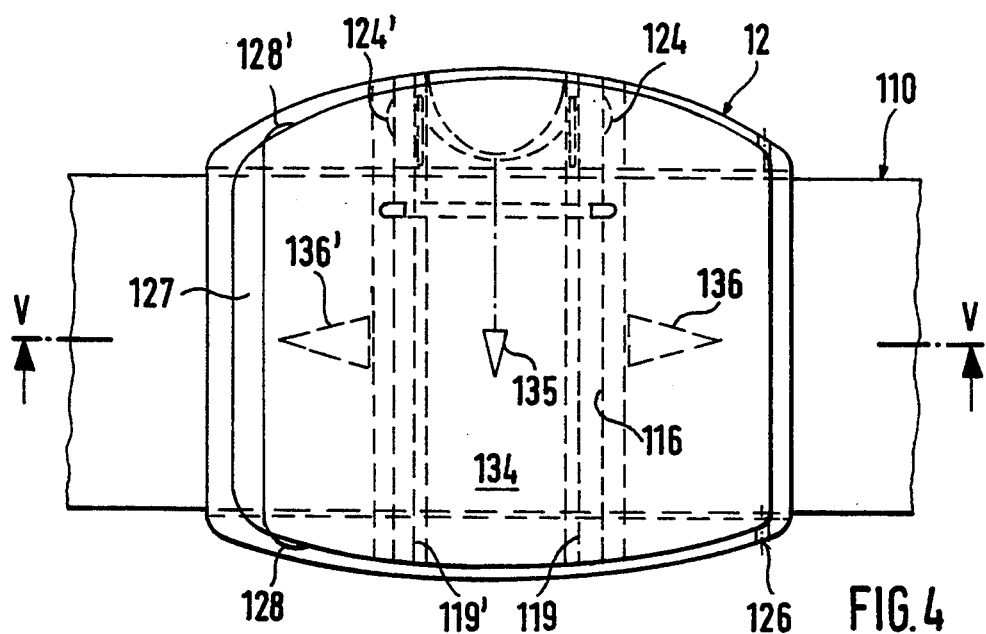
FIG. 4 is a view similar to that in FIG. 1 of a belt section with a different type of belt-severing mechanism fastened to it tight.
Figure 5:
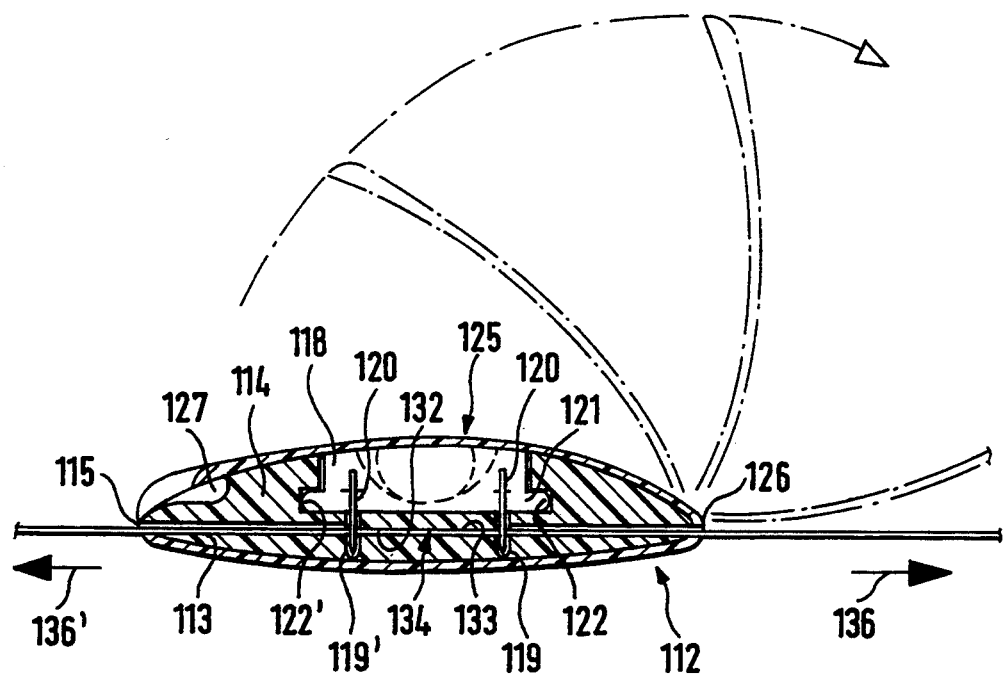
FIG. 5 is a section through the second embodiment along the line V—V in FIG. 4.

The parts illustrated in FIGS. 4 and 5 that are similar to those illustrated in FIGS. 1 through 3 are identified by the same reference numbers increased by 100.

This embodiment differs from the one illustrated in FIGS. 1 through 3 mainly in that severance-prevention cover 125 swings up in the direction indicated by arrow 135 around an axis 126 of articulation extending at a right angle to belt-accommodating slot 115 out of its severance-prevention position and into a position that allows slide 118 to initiate the severing process. Axis 126 of articulation is located at the front of belt-accommodating slot 115 on one side of top 114. The various positions of the severance-prevention cover 125 as it swings open are represented by the dot-and-dash lines in FIG. 5.

As will be particularly evident from FIG. 4, severance-prevention cover 125 extends essentially over the total length and width of top 114. The edge of the cover that is remote from axis 126 of articulation is in the vicinity of a grip-facilitating depression 127 in top 114. Depression 127 facilitates gripping the edge of the cover and hence pivoting it up in an emergency into the position in which it allows slide 118 to initiate the severing process. Both longitudinal edges of top 114 are elevated. The severance-prevention cover fits between the elevated edges when it is down. The cover is kept down by catches 128 and 128' on each end of the edge remote from axis 126 of articulation. Catches 128 and 128' snap into matching depressions in the elevated edges of top 114.

The slide track is, like the slide track in the embodiment illustrated in FIGS. 1 through 3, constituted by a channel 116 that extends across belt-accommodating slot 115. The edge of the top is breached at the side of the belt-severing mechanism where the slide is located when inactive, and the slide has a matching edge that rests, as long as the slide is inactive and blocked by severance-prevention cover 125, against the matching front edge of the cover. The slide is accordingly locked into its inactive position not only by the hold mediated by catches 124 and 124' but also by the contact between the elevated edge and the front edge of the severance-prevention cover as long as cover is in the severance-prevention position and cannot be actuated until the cover as been swung up as represented by the dot-and-dash lines in FIG. 5.

When a belt-severing mechanism 12 or 112 is employed in a seat-belt system in a motor vehicle, it will be of advantage to position the belt-severing mechanism on safety belt 10 or 110 where it will be in the vicinity of the passenger's pelvis when the belt is buckled at the end facing the door of the vehicle. This approach will ensure that, when the belt-locking mechanism, which is usually located between adjacent seats, is inaccessible, the belt-severing mechanism can be accessed by the passenger or by rescue personnel as soon as a door can be opened. The belt-locking mechanism can be inaccessible due to damage to the vehicle as a result of collision for example.

Belt-severing mechanism 12 or 112 can be activated just by pivoting up severance-prevention cover 25 and 125 out of the position in which it is maintained by catches 28 and 28' or 128 and 128' and displacing slide 18 or 118 along channel 16 or 116 in conjunction with blades 20 and 20' or 120 and 120'. This motion, which is in the direction indicated by the arrow 35 in FIG. 2 or 135 in FIG. 4, will result in the severance of safety belt 10 or 110 clasped inside the belt-severing mechanism and between the blades on each side of severing-mechanism clasping section 34 or 134. The sections of belt loosely accommodated at the sides of blades 20 and 20' or 120 and 120' facing away from the clasping section in the vicinity of belt-accommodating slot 15 or 115 will on the other hand be able to slide out of the slot unimpeded in the direction indicated by arrows 36 and 36' or 136 and 136'. The belt will accordingly be released.

The belt is accordingly severed on each side of its tightly clasped section when belt-severing mechanism 12 or 112 is actuated. The belt-severing mechanism will accordingly be entirely separated from the belt, and the two separate sections will slide out of the sections of belt-accommodating slot on the sides of blades 20 and 20' or 120 and 120' remote from severing-mechanism clasping section 34 or 134.

I claim:

1. A seat-belt system for use in motor vehicles comprising a seat belt whereby at least one end of the belt is secured to a vehicle, a belt-severing mechanism clasped tight against one section of the belt for severing the belt, the belt-severing mechanism including a belt-accommodating slot which accommodates the belt, the slot having a clasping section for clasping at least one section of the belt when the belt extends through the slot, wherein the belt-severing mechanism includes means for severing the belt comprising two blades positioned at separate points along the belt and actuatable in conjunction and across the belt, the clasping section being disposed between the two blades.

2. Seat-belt system as in claim 1, wherein the blades are associated with a slide that slides across the belt-accommodating slot.

3. Seat-belt system as in claim 2, wherein the slide is clasped with the blades in a position to one side of the belt in the belt-accommodating slot.

4. Seat-belt system as in claim 2, wherein ends of the blades remote from the slide engage blade-guiding grooves.

5. Seat-belt system as in claim 2, wherein the belt-severing mechanism comprises a top, including the slide and a slide track inside, and a base fastened to the top, the belt-accommodating slot and the clasping section extending between the top and base.

6. Seat-belt system as in claim 5, wherein the base and top are essentially congruent injection-molded plastic components secured together with screws with the belt-accommodating slot between the base and top.

7. Seat-belt system as in claim 6, wherein the top and base are joined together by a spliced-on hinge.

8. Seat-belt system as in claim 2, wherein the belt-severing mechanism is prevented from severing the belt by a cover, whereby the cover extends over the slide in the vicinity of a track that extends across the belt-accommodating slot, the cover is secured over the slide by a clip stop, and compression exerted by the stop can be overcome and the cover pivoted up to release the slide.

9. Seat-belt system as in claim 8, wherein the cover is provided with a barrier tab which, when the cover is secured, mechanically prevents the slide from being actuated while allowing the slide to be actuated when the cover is unsecured.

10. Seat-belt system as in claim 9, wherein the severance-prevention cover pivots on the belt-severing mechanism around an axis that parallels the belt-accommodating slot and extends along the belt.

11. Seat-belt system as in claim 9, wherein the clip stop on the cover is associated with the barrier tab, the barrier tab comprising spring-loaded spherical snap-in knobs that project out laterally beyond the barrier tab and when the cover is secured, the knobs engage notches.

12. Seat-belt system as in claim 8, wherein the cover pivots on a housing of the belt-severing mechanism around an axis perpendicular to the belt-accommodating slot and to the belt.

13. Seat-belt system as in claim 11, wherein a front edge that acts as an impact point for the slide blocks the path of the slide and the blades while the cover is covering the track.

* * * * *